United States Patent

Ito et al.

[11] Patent Number: 5,826,016
[45] Date of Patent: Oct. 20, 1998

[54] PASS-WORD MANAGING SYSTEM AND PASS-WORD MANAGING METHOD

[75] Inventors: Toshiya Ito, Zama; Kosuke Takano; Hiromichi Ito, both of Yokohama; Mitsuru Mori, Atsugi, all of Japan

[73] Assignees: Hitachi, Ltd., Tokyo; Hitachi Software Engineering, Yokohama, both of Japan

[21] Appl. No.: 653,394

[22] Filed: May 24, 1996

[30] Foreign Application Priority Data

May 26, 1995 [JP] Japan ................................ 7-128372

[51] Int. Cl.⁶ .................................................. H04K 1/00
[52] U.S. Cl. ........................................ 395/188.01; 380/23
[58] Field of Search ........................... 395/186, 187.01, 395/188.01; 380/3, 4, 23, 25

[56] References Cited

U.S. PATENT DOCUMENTS 4,317,957  3/1982  Sendrow .
4,758,718  7/1988  Fujisaki et al. .

FOREIGN PATENT DOCUMENTS

36/226217  5/1986  Japan .............................. G06F 15/21
40/209212  9/1988  Japan .............................. H04L 9/06

OTHER PUBLICATIONS

JP-A-4-84254 (only abstract).
JP-A-1-99157 (only abstract).
JP-A-4-30241 (only abstract).
Algorithm Register Entry (Multi 2).

*Primary Examiner*—Albert Decady
*Attorney, Agent, or Firm*—Antonelli, Terry, Stout & Kraus, LLP

[57] ABSTRACT

When transmitting a pass-word updating request transmitted from a local host to a remote host via a network, both a present pass-word and a new pass-word are enciphered with the present pass-word of a user as a key of enciphering and then are transmitted. The remote host fetches the present pass-word from a pass-word table on the basis of a user ID and then deciphers the pass-word updating request transmitted thereto with the resultant present pass-word as a key of deciphering. Then, only when the specified present password in the pass-word updating request frame matches with the present pass-word registrated in the pass-word table, the remote host updates the present pass-word into the specified new pass-word.

6 Claims, 4 Drawing Sheets

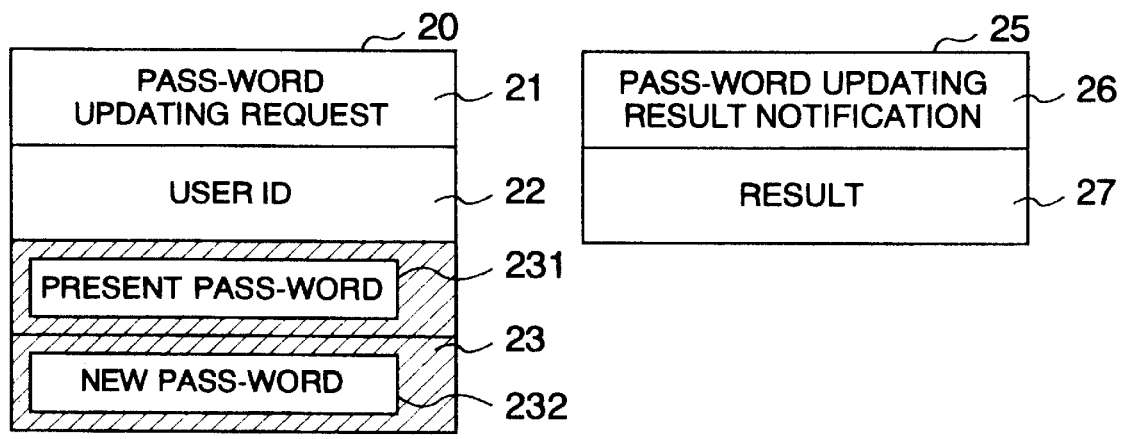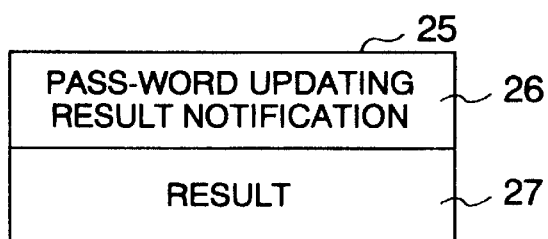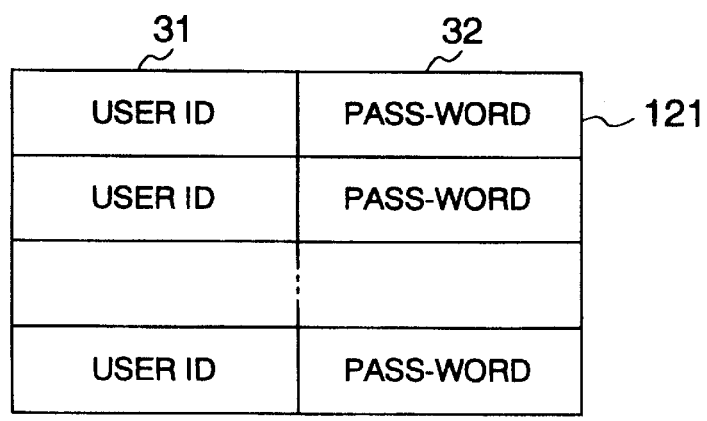

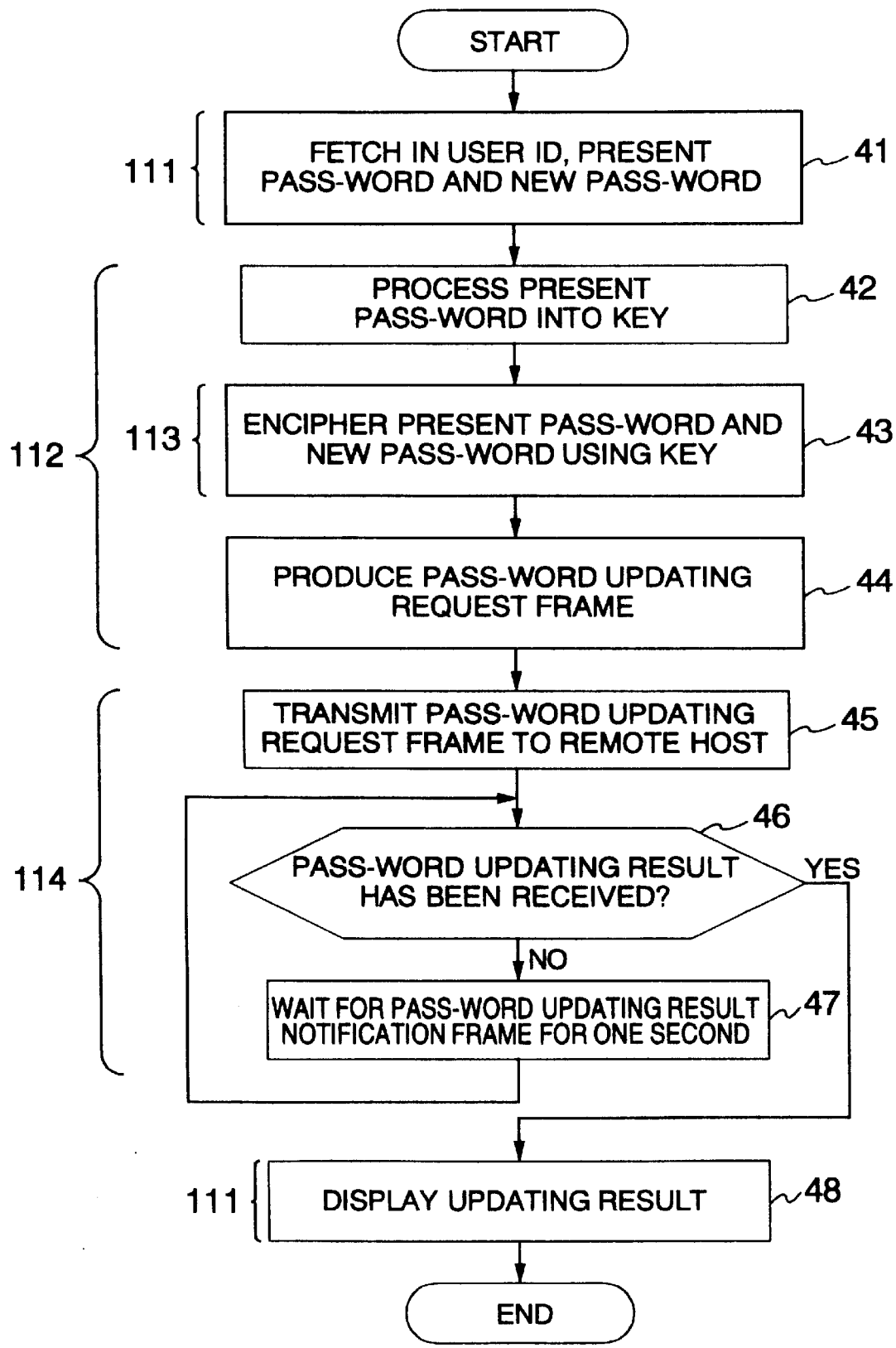

PASS-WORD MANAGING SYSTEM AND PASS-WORD MANAGING METHOD

BACKGROUND OF THE INVENTION

1. Field of the Invention

The present invention relates in general to a pass-word managing system, and, more particularly, to a pass-word managing system and a pass-word managing method which are characterized by a method of protecting the confidentiality of a pass-word used to authenticate an authorized user.

2. Description of the Related Art

Heretofore, a computer which has a plurality of users has a pass-word table in which a user ID for identifying the authorized user of interest and a present pass-word for authenticating the authorized user of interest are registered with respect to all the users. When the user intends to update the present pass-word, in order to minimize the possibility of the present pass-word from being updated wrongly by the wrong user other than the authorized user, the following method is adopted. That is, the computer carries out the control in such a way that, after the operator is commanded to input both the present pass-word which should be currently registered and a new pass-word into which the present pass-word is intended to be newly updated, the present pass-word thus input is compared with the present pass-word which is actually registered, and the processing of updating the present pass-word into the new pass-word is made valid only when the input present pass-word matches with the pass-word which is actually registered. As an example, a "passwd" command of unix can be taken.

In order to carry out the control as described above in the case where a computer body having the pass-word table (hereinafter, referred to as "a remote host" for short, when applicable) is connected to the terminal equipment or the personal computer which the user operates (hereinafter, referred to as "a local host" for short, when applicable) through a network, the input pass-word must flow as the data on the network. However, if the pass-word flow on the network as it is, there may arise the possibility that the contents of the pass-word is leaked to a third person by means of wire tapping or the like for the network, and therefore can be used for wrong purposes by a wrong user. Therefore, it is desirable that when the data including the pass-word flows on the network, the data of the pass-word is enciphered.

Now, the method of enciphering the data is classified roughly into the following two categories. However, even when any of the enciphering methods is adopted, the management of suitably registering the key in accordance with the enciphering method should be carried out by both the remote host holding the pass-word table and the local host which receives the request for updating the present pass-word into a new pass-word from the user.

① The symmetric enciphering method.

The key of enciphering matches the key of deciphering (the common key cipher).

② The asymmetric enciphering method.

The key of enciphering does not match the key of deciphering.

Now, when the above-mentioned symmetric enciphering method is adopted, there are well known the following two kinds techniques of managing the registration of the enciphering key and the of deciphering.

① (a) First technique managing the registration of the keys.

All of the keys are previously set and are statically held in both the remote host and the local host.

① (b) Second technique of managing the registration of the keys.

The keys which are previously set are held in the key server which is separately provided, and then whenever required, the local host dynamically fetches the corresponding key from the key server.

In addition, when the above-mentioned asymmetric enciphering method 2 is adopted, similarly, there are well known the following three kinds of techniques managing the registration of the enciphering key and the deciphering key.

② (a) First technique of managing the registration of the keys.

All of the pairs of enciphering and deciphering keys are previously set, and all of the deciphering keys are statically held in the remote host and also all of the enciphering keys are statically held in the local host.

② (b) Second technique of managing the registration of the keys.

All of the pairs of enciphering and deciphering keys are previously set so as to be statically held in the remote host, and then whenever the enciphering key is required, the local host dynamically fetches the corresponding enciphering key from the remote host.

② (c) Third technique of managing the registration of the keys.

Whenever required, the pair of the enciphering key and the deciphering key are dynamically produced on the remote host on the basis of the random numbers, and also the local host dynamically fetches the enciphering key from the remote host.

When the enciphered pass-word data flows on the network by utilizing the above-mentioned prior art, the key required for the enciphering needs to be either previously held statically in the local host or dynamically fetched from the remote host or the key server by the local host. For this reason, in particular, in the symmetric enciphering method, there arises the possibility that when distributing the produced key to each of the local hosts, the contents of the key may be leaked to a third person. This is a problem associated with the prior art. In addition, in both the symmetric and asymmetric enciphering methods, when changing the key, the key which is held in all of the local hosts which hold the same key in common must be reset, and hence the management for setting the key becomes complicated. This is another problem. On the other hand, in order for the local host to dynamically fetch the key from the remote host whenever the key is required, the special protocol processing including the enciphering processing procedure relating to obtaining the key must be mounted, and hence the protocol processing becomes complicated. This is still another problem.

SUMMARY OF THE INVENTION

The present invention was made in order to solve the above-mentioned problems associated with the prior art, and it is therefore an object of the present invention to provide a symmetric enciphering method which is capable of reducing the possibility that the contents of the key required for enciphering and deciphering of the pass-word data which is transmitted/received via a network, along with the processing of updating the registration of the pass-word table, is leaked to a third person, and also of simplifying the processing relating to the management of the keys. The password managing method and system are characterized by employing a technique of managing the registration of the keys which is different from the above-mentioned techniques ① (a) and (b).

In order to attain the above-mentioned object, according to the present invention, there is provided a pass-word managing system including a remote host for holding a pass-word table in which a user ID for identifying an authorized user of interest and a present pass-word for authenticating the authorized user of interest are registered with respect to all of the authorized users. There is further included at least one or more local hosts connected to the remote host through a network for transmitting a pass-word updating request produced in accordance with a predetermined instruction operation by the authorized user to the remote host through the network, wherein each of the local hosts enciphers, when producing the pass-word updating request in accordance with the instruction operation, the pass-word updating request with the specified present password as a key of enciphering and then transmits the enciphered pass-word updating request to the remote host. The remote host deciphers the pass-word updating request, which has been transmitted to the remote host, with the present pass-word of the authorized user registered in the pass-word table as a key of deciphering, and then updates the present pass-word into a specified new pass-word, into which the present pass-word is being requested so as to be updated, to register the new pass-word in the pass-word table only when the specified present pass-word which is being requested, in order to be updated into the new password, matches with the present pass-word registered in the pass-word table.

Therefore, the key required for enciphering and deciphering of the pass-word data which is transmitted/received through the network along with the processing of updating the registration of the present pass-word registered in the pass-word table is also used as the present pass-word, and hence it becomes unnecessary to carry out the distribution of the key (the present pass-word) between the remote host and the local hosts prior to deciphering the pass-word updating request. As a result, the possibility that the contents of the key (the present pass-word) may be leaked to a third person can be reduced, and also the processing relating to the management of the keys is integrated with the processing relating to the management of the pass-word table. Therefore, since the processing of dynamically fetching the key and the like become unnecessary, the processing can be generally simplified.

BRIEF DESCRIPTION OF THE DRAWINGS

These and other objects as well as advantages of the present invention will become clear by the following description of the preferred embodiment of the present invention with reference to the accompanying drawings, wherein:

FIG. 2A is a schematic view showing a structure of an example of a pass-word updating request frame which is transmitted/received in the system shown in FIG. 1, and FIG. 2B is a schematic view showing a structure of an example of a pass-word updating result frame which is transmitted/received in the system of FIG. 1;

FIG. 3 is a schematic view showing an example of a data format in a pass-word table which is held in a remote host shown in FIG. 1;

FIG. 4 is a flow chart showing a processing when a local host carries out the pass-word updating request.

DESCRIPTION OF THE PREFERRED EMBODIMENTS

An embodiment of a pass-word managing system according to the present invention will hereinafter be described in detail with reference to the accompanying drawings.

Figure 1:
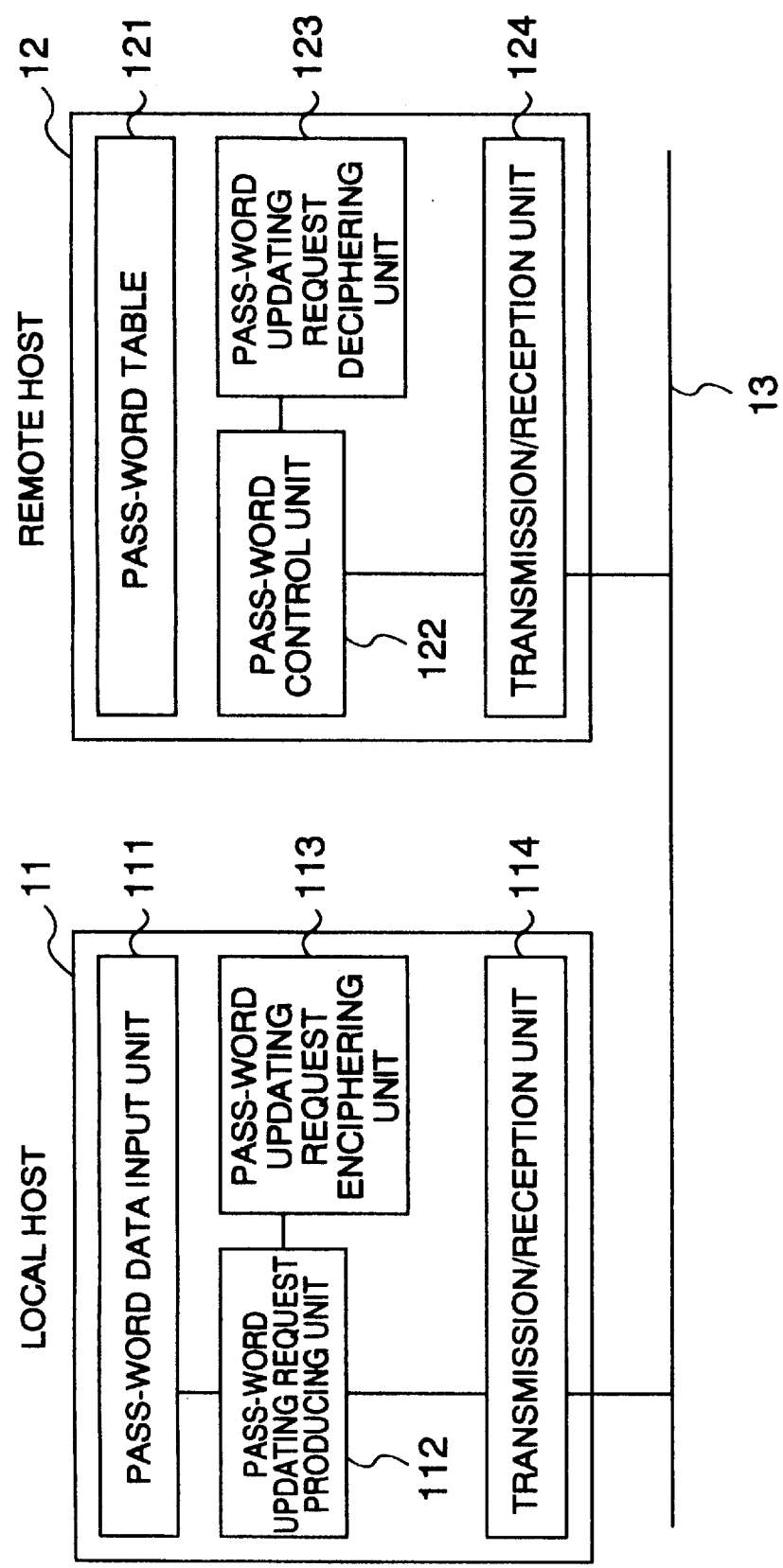
FIG. 1 is a block diagram showing a configuration of an embodiment according to a pass-word managing system of the present invention.

FIG. 1 is a block diagram showing a configuration of an embodiment of a pass-word managing system of the present invention. In the figure, the pass-word managing system includes, but is not limited to, a local host 11 which transmits a pass-word updating request in accordance with an operation instruction issued from a user, a remote host 12 which executes a pass-word updating processing in accordance with the pass-word updating request which is transmitted from the local host 11, and a network 13 which connects the local host 11 and the remote host 12 to each other and which serves to relay the pass-word updating request which is transmitted from the local host 11 to the remote host 12 therethrough.

The local host 11 is a computer such as a personal computer including a CPU, a memory, a line interface and a keyboard, and the remote host 12 is also a computer including a CPU, a memory and a line interface. Though not illustrated in particular in FIG. 1, while the single local host 11 does not necessarily correspond to the remote host 12, in general, a large number of local hosts 11 may be connected to the network 13. In addition, the system having this configuration acts as a normal computer network.

The local host 11 has a pass-word data input unit 111, a pass-word updating request producing unit 112, a pass-word updating request enciphering unit 113 and a transmission/reception unit 114. In addition, the remote host 12 has a pass-word table 121, a pass-word control unit 122, a pass-word updating request deciphering unit 123, and a transmission/reception unit 124. With respect to those units, the pass-word table 121 is realized by a memory such as a main memory or an auxiliary memory, and other units are realized by software which is executed by using both the CPU and the memory. A part or all of the pass-word updating request enciphering unit 113 and the pass-word updating request deciphering unit 123 may also be realized by hardware such as a dedicated processor.

FIG. 2A is a schematic view showing a structural example of a pass-word updating request frame which is transmitted from the local host 11 to the remote host 12. A header 21 of the pass-word updating request frame 20 has the information indicating that the frame is a pass-word updating request in order to identify the frame. In addition, the pass-word updating request frame 20 has a user ID (identifier) 22 for identifying the authorized user corresponding to the pass-word to be updated, and pass-word updating information 23 which is obtained by enciphering a present pass-word 231 as the pass-word before updating and a new pass-word 232 as the pass-word after updating.

FIG. 2B is a schematic view showing a structural example of a pass-word updating result notification frame which the remote host 12 transmits to the local host 11 in response to the pass-word updating request frame transmitted thereto. A header 26 of a pass-word updating result notification frame 25 has information indicating that the frame for identifying the frame is the pass-word updating result notification, and a result 27 thereof has O.K./NG information representing whether or not the pass-word updating is normally carried out.

FIG. 3 is a schematic view showing a structural example of the data storage format of the pass-word table 121 which is held in the remote host 12 shown in FIG. 1. In the figure, reference numeral 31 designates a storage column and reference numeral 32 designates a pass-word storage column. For all of the authorized users who can access the remote host 12 through the network 13, a set of user ID for identifying the authorized user of interest and present pass-word for authenticating the authorized user of interest are previously stored in the user ID storage column 31 and the pass-word storage column 32, respectively in the pass-word table 121.

The user ID is uniquely given to each of the users in the system and may be either a sequential number or a combination of alphanumeric characters. The pass-word is determined by the associated user. Then, in general, the pass-word has the form of a combination of alphanumeric characters. In addition, the maximum number of characters is determined for the pass-word by the system, and hence the number of characters can be freely determined for the pass-word without departing from the maximum number of characters. When storing the pass-word in the pass-word table, the Null (Hex"00") padding is carried out after the pass-word until the maximum number of characters is obtained.

Next, a description will hereinbelow be given with respect to the operation when the user instructs the local host 11 to operate, thereby updating the contents of the pass-word table 121 in the remote host 12 through the network 13 with reference to FIGS. 1, 4 and 5.

At the time when the pass-word updating command has been input from a keyboard through the operation by the user, the local host 11 starts to execute a series of processings shown in FIG. 4.

First, the local host fetches therein the user ID, the present pass-word and the new pass-word which have been input subsequent to the command issued through the operation by the user (Step 41).

There are a large number of enciphering algorithms, and some of them are open to the public. In this example, there is employed MULTI2 developed by Hitachi Co. Ltd. which is a sort of the common key cipher and the algorithm of which is registered in ISO (International Organization for Standardization) and is open to the public. In MULTI2, the bit stream of 64 bits is used as a key. In order to use the present pass-word which has been fetched in Step 41 as the key, the following processing is executed. When the pass-word is 8 characters, the pass-word becomes 64 bits in binary notation, and therefore, the pass-word is directly utilized as the enciphering key. When the pass-word is 9 or more characters, only the first 8 characters are used as the key. When the pass-word is 7 or less characters, the bit "0" is padded after these characters until 64 bits are obtained (Step 42). By using the key which has been obtained in such a way, both the present pass-word and the new pass-word are enciphered using the algorithm of MULTI2. In MULTI2, the enciphering is repeatedly carried out 8 times (in 8 stages) using the same key. Even when the enciphering is carried out, the length of the data is not changed at all. For both the present pass-word and the new pass-word, the Null (Hex"00") is padded after each of those pass-words until the maximum number of characters which is determined in the system is obtained so as to obtain the fixed length, and then the enciphering therefor is carried out (Step 43).

Next, the pass-word updating request frame shown in FIG. 2A is produced (Step 44).

Then, the pass-word updating request frame which has been produced in Step 44 is transmitted to the remote host 12 through the line interface in accordance with the protocol which is determined in the network (Step 45).

Thereafter, the reception of the pass-word updating result notification frame shown in FIG. 2B which has been transmitted from the remote host 12 is awaited (Steps 46 and 47), and the updating result is displayed on the display device, thereby informing the user whether the pass-word updating has succeeded or failed (Step 48).

In FIG. 4, Steps 41 and 48, Steps 42 to 44, Step 43 and Steps 45 to 47 correspond to the pass-word data input unit 111, the pass-word updating request producing unit 112, the pass-word updating request enciphering unit 113 and the transmission/reception unit 114, respectively.

Figure 5:
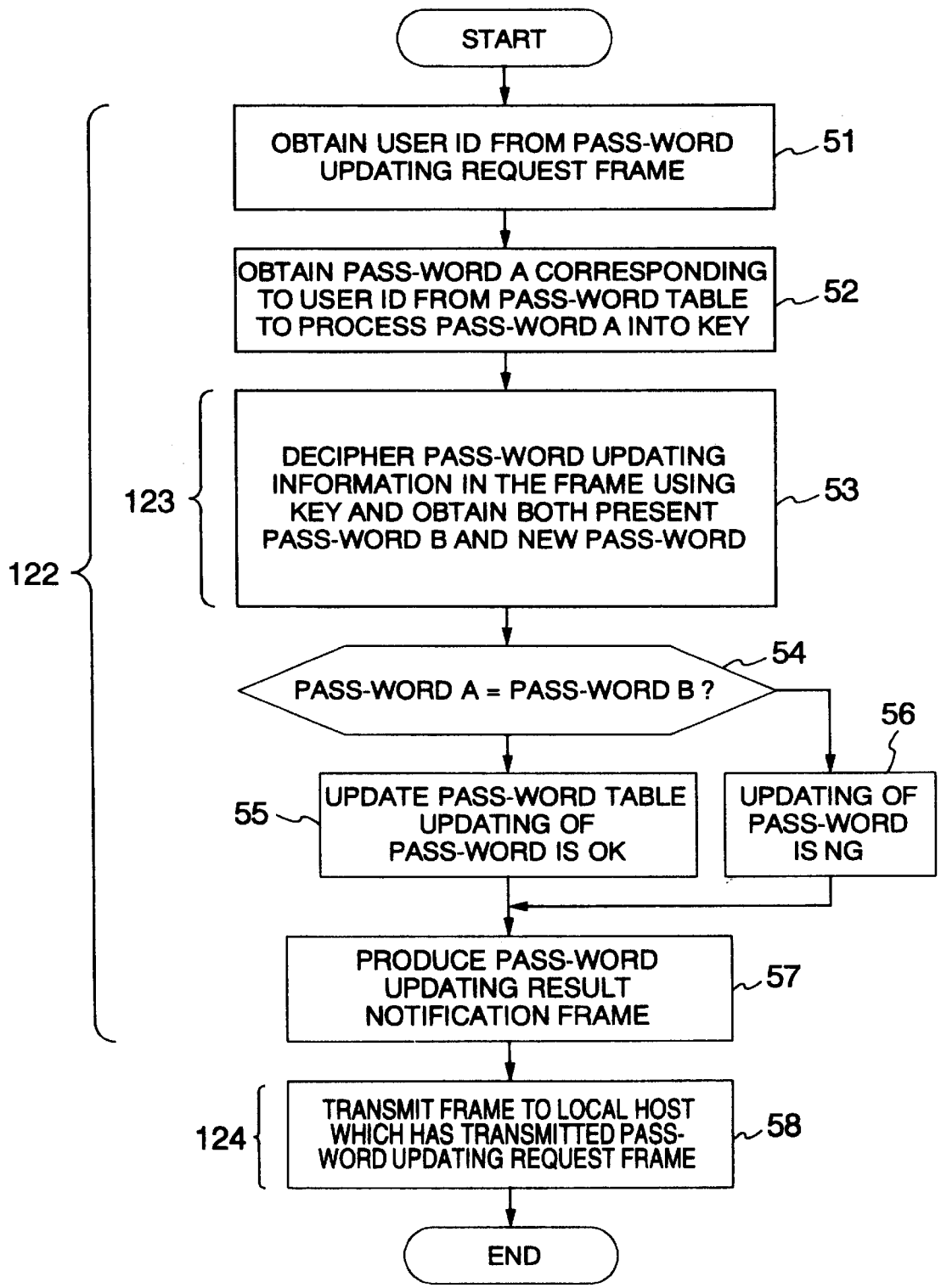
FIG. 5 is a flow chart showing a processing when a remote host receives the pass-word updating request.

Upon receiving the pass-word updating request frame, the remote host 12 starts a series of processings shown in FIG. 5.

Firstly, the remote host 12 fetches the user ID from the pass-word updating request frame having the format of FIG. 2A (Step 51).

Next, the remote host 12 retrieves the user ID 31 from the pass-word table 121 in order to search for the user ID matching with the user ID in the pass-word updating request frame, thereby obtaining the corresponding pass-word 32 (assigned the pass-word A). In order to use the pass-word A as the deciphering, the same processing as that in Step 42 of FIG. 4 is carried out for the pass-word A (Step 52).

Then, the pass-word updating information 23 in the pass-word updating request frame is deciphered using the key which has been obtained in Step 52. The deciphering is also carried out in accordance with the algorithm determined in MULTI2, and as a result, both the present pass-word (assigned the pass-word B) and the new pass-word are obtained (Step 53).

Next, the pass-word A in the pass-word table 121 is compared with the pass-word B which has been fetched from the received pass-word updating request frame to be deciphered (Step 54). When the pass-word A matches the pass-word B, the present pass-word 32 in the pass-word table is updated into the new pass-word which has been fetched from the pass-word updating request frame to be deciphered, and then it is judged that the updating result has succeeded (O.K.)(Step 55). On the other hand, when the pass-word A does not match the pass-word B, the updating of the pass-word table is not carried out, and then it is judged that the updating result fails (NG)(Step 56).

Next, the pass-word updating result notification frame shown in FIG. 2B is produced (Step 57), and the pass-word updating result notification frame is transmitted from the remote host 12 to the local host 11 which has transmitted the pass-word updating request frame (Step 58).

In FIG. 5, Steps 51 to 57, Step 53 and Step 58 correspond to the pass-word control unit 122, the pass-word updating request deciphering unit 123 and the transmission/reception unit 124, respectively.

While MULTI2 has been utilized as the enciphering algorithm in the above-mentioned embodiment, any other common key enciphering algorithm such as DES (Data Encryption Standard) may be utilized as the enciphering algorithm.

While in the above-mentioned embodiment, only a part of the pass-word updating request frame is enciphered when carrying out the change of the pass-word, thereafter, the important information which the remote host transmits/ receives to/from the local host may be enciphered/deciphered using the new pass-word.

In the remote host computer, in order to prevent the pass-word table from being viewed by unintended persons, the whole of the pass-word table or the pass-word portion thereof may be uniquely enciphered in some cases. However, since the enciphering of this pass-word table is carried out only in the inside of the remote host, the processing of deciphering the pass-word table is added between Steps 51 and 52 of FIG. 5, and also the processing of enciphering the pass-word table is added after Step 55 of FIG. 5, whereby the pass-word managing method according to the present specification can be applied.

While the present invention has been particularly shown and described with reference to the preferred embodiment thereof, it will be understood by those skilled in the art that the foregoing and other changes in form and details can be made therein without departing from the spirit and scope of the invention.

What is claimed is:

1. In a pass-word managing system including a remote host and at least one or more local hosts connected to said remote host through a network, a pass-word managing method comprising the steps of:

registering, in a pass-word table in said remote host, with respect to each of a plurality of authorized users, a user ID for identifying one of said authorized users of interest and a corresponding present pass-word for authenticating said authorized user of interest;

enciphering the present pass-word and a new pass-word input by a user, with said present pass-word utilized as an enciphering key;

transmitting a pass-word updating request including a user ID of said user, the enciphered present pass-word and the enciphered new pass-word to said remote host through said network from said local host;

deciphering said pass-word updating request, with said present pass-word utilized as a deciphering key; and updating, a present pass-word registered in said pass-word table with the new pass-word included in said pass-word updating request only when the present pass-word included in said pass-word updating request matches the present pass-word registered in said pass-word table and the user ID included in said pass-word updating request matches a user ID registered in said pass-word table corresponding to the present pass-word registered in said pass-word table.

2. A pass-word managing method according to claim 1, wherein, for using the present pass-word as the enciphering key and the deciphering key, when a pass-word length is longer than the key length which is determined by a corresponding enciphering or deciphering method, only data from the head of the present pass-word having a length corresponding to the key length is used as the corresponding enciphering or deciphering key, and when the pass-word length is shorter than the key length, Null (Hex"00") is added to an end of the present pass-word until the length of the present pass-word matches the key length so as to use the resultant data as either of the enciphering key and deciphering key.

3. A pass-word managing method according to claim 1, wherein MULTI2 is used as the algorithm of enciphering/deciphering.

4. A pass-word managing system, comprising:
a remote host; and
at least one or more local hosts connected to said remote host through a network, wherein said local host comprises:
a pass-word data input unit for receiving a pass-word updating request from a user and receiving, as an input, a user ID assigned uniquely to the user in said system, a present pass-word for authenticating the user and a new pass-word,
an enciphering unit for enciphering both the present pass-word and the new pass-word, which have been input to said pass-word data input unit, using the present pass-word as an enciphering key,
a pass-word updating request producing unit for producing a pass-word updating request frame including the user ID which has been input to said pass-word data input unit, the enciphered present pass-word and the enciphered new pass-word, and
a transmission unit for transmitting the pass-word updating request frame to said remote host; and said remote host comprises:
a pass-word table in which, with respect to each of a plurality of authorized users, both the user ID and the present pass-word are registered,
a reception unit for receiving the pass-word updating request frame transmitted from said local host;
a deciphering unit for deciphering the enciphered portion of the pass-word updating request, frame with the present pass-word registered in said pass-word table corresponding to the user ID included in the pass-word updating request frame serving as a deciphering key, and
a pass-word control unit for updating the present pass-word registered in said pass-word table with the new pass-word in the pass-word updating request frame only when the present pass-word included in said pass-word updating request frame matches the present pass-word registered in said pass-word table corresponding to the user ID included in said pass-word updating request frame.

5. A program storage device readable by a machine, tangibly embodying a program of instructions executable by the machine, the machine being connected to a host machine via a network, to perform a method for updating pass-words managed in said host machine, said method comprising the steps of:

receiving a pass-word updating request including a user ID for identifying each authorized user, a present pass-word for authenticating the authorized user, and a new pass-word input from a user;

enciphering the present pass-word and the new pass-word using the present pass-word as an enciphering key;

generating a pass-word updating request frame including the user ID and the enciphered present pass-word and enciphered new pass-word; and transmitting the pass-word updating request frame to said host machine via the network.

6. A program storage device readable by a machine, tangibly embodying a program of instructions executable by the machine, the machine being connected to at least one local machine via network, to perform a method for updating pass-words in a pass-word table having pairs of a user ID for identifying each authorized user and a present pass-word for authenticating the authorized user stored in the machine, said method comprising the steps of:

receiving a pass-word updating request frame including the user ID, the present pass-word in enciphered form and a new pass-word in enciphered form from the local machine via the network;

obtaining from the pass-word table a present pass-word corresponding to the user ID included in said pass-word updating request frame;

deciphering the enciphered present pass-word and enciphered new pass-word in the received pass-word updating request frame using the present pass-word obtained from the pass-word table as a deciphering key;

comparing the present pass-word obtained from the pass-word table with the present pass-word obtained from the received pass-word updating request frame; and when both present pass-words match, updating the pass-word table by replacing the present pass-word obtained from the pass-word table with the new pass-word deciphered in said deciphering step.

* * * * *